United States Patent
Inao et al.

(10) Patent No.: US 9,376,070 B2
(45) Date of Patent: Jun. 28, 2016

(54) WIRE HARNESS COMBINATION STRUCTURE

(71) Applicant: YAZAKI CORPORATION, Tokyo (JP)

(72) Inventors: Shinichi Inao, Makinohara (JP);
Hideomi Adachi, Makinohara (JP);
Takeshi Ogue, Makinohara (JP);
Tatsuya Oga, Makinohara (JP);
Masaaki Suguro, Makinohara (JP);
Yoshiaki Ozaki, Makinohara (JP);
Hiroyuki Yoshida, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/610,039

(22) Filed: Jan. 30, 2015

(65) Prior Publication Data

US 2015/0136484 A1    May 21, 2015

Related U.S. Application Data

(63) Continuation of application No. PCT/JP2013/073439, filed on Aug. 30, 2013.

(30) Foreign Application Priority Data

Sep. 3, 2012 (JP) ................... 2012-192780

(51) Int. Cl.
*B60R 16/02* (2006.01)
*H02G 3/04* (2006.01)
(Continued)

(52) U.S. Cl.
CPC .......... *B60R 16/0215* (2013.01); *H02G 3/0406* (2013.01); *H02G 3/32* (2013.01); *F16B 7/0433* (2013.01); *H02G 3/0468* (2013.01)

(58) Field of Classification Search
CPC ..... H02G 3/0406; H02G 3/32; H02G 3/0468; B60R 16/0215; F16B 7/0433
USPC ........................................................ 174/72 A
See application file for complete search history.

(56) References Cited

U.S. PATENT DOCUMENTS

| | | | |
|---|---|---|---|
| 5,649,626 | A | 7/1997 | Sawamura et al. |
| 2010/0043225 | A1 | 2/2010 | Oga et al. |

(Continued)

FOREIGN PATENT DOCUMENTS

| | | |
|---|---|---|
| EP | 0 543 469 A1 | 5/1993 |
| GB | 2 276 279 A | 9/1994 |

(Continued)

OTHER PUBLICATIONS

Written Opinion for PCT/JP2013/073439 dated Oct. 1, 2013 [PCT/ISA/237].

(Continued)

*Primary Examiner* — Hoa C Nguyen
*Assistant Examiner* — Amol Patel
(74) *Attorney, Agent, or Firm* — Sughrue Mion, PLLC

(57) ABSTRACT

Each of wire harnesses includes a conductive path, an exterior member which covers the conductive path, a base portion which is retrofitted to or integrally formed with the exterior member, and a combination structure portion which is integrally formed with the base portion. The combination structure portion includes a combining engagement portion and a combined engagement portion. The combining engagement portion of the combination structure portion in one of the wire harnesses is detachably engaged with the combined engagement portion of the combination structure portion in the other wire harness, or the combined engagement portion of the combination structure portion in the one of the wire harnesses is detachably engaged with the combining engagement portion of the combination structure portion in the other wire harness, so that the wire harnesses are combined with each other.

8 Claims, 11 Drawing Sheets

(51) Int. Cl.
*H02G 3/32* (2006.01)
*F16B 7/04* (2006.01)

(56) References Cited

U.S. PATENT DOCUMENTS

| 2010/0045106 | A1 | 2/2010 | Oga et al. |
| 2013/0061197 | A1 | 3/2013 | Funakoshi |

FOREIGN PATENT DOCUMENTS

| JP | 10-299951 | A | | 11/1998 |
| JP | 2004-268803 | A | | 9/2004 |
| JP | 2009-143326 | A | | 7/2009 |
| JP | 2009143326 | A | * | 7/2009 |
| JP | 2010-047031 | A | | 3/2010 |
| JP | 2011-091904 | A | | 5/2011 |
| JP | 2011091904 | A | * | 5/2011 |
| WO | 2011/149078 | A1 | | 12/2011 |

OTHER PUBLICATIONS

International Search Report for PCT/JP2013/073439 dated Oct. 1, 2013 [PCT/ISA/210].
Communication issued Feb. 16, 2016, issued by the Japanese Patent Office in counterpart Japanese Patent Application No. 2012-192780.
Communication dated Mar. 24, 2016 issued by European Patent Office in counterpart European Patent Application No. 13833906.4.

* cited by examiner

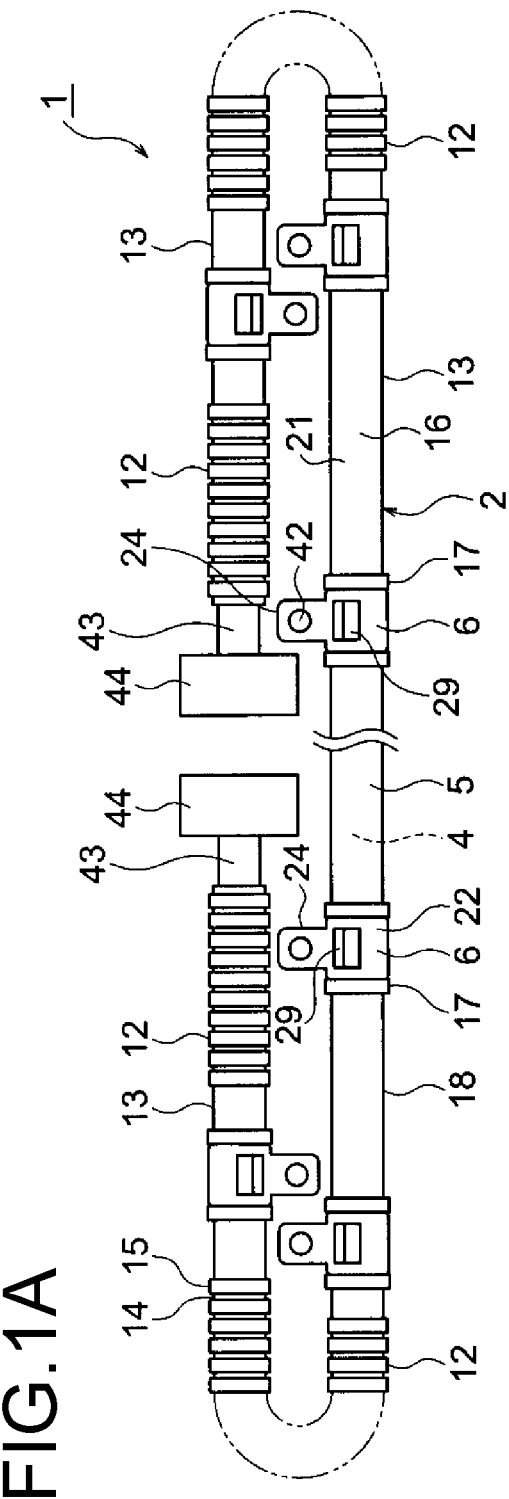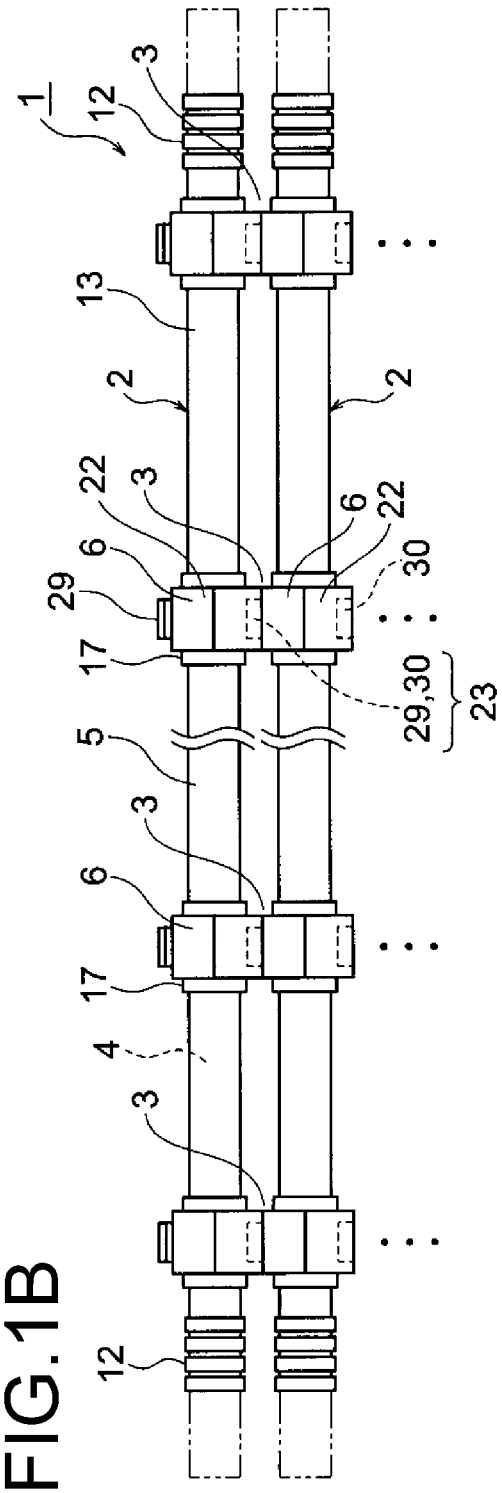

WIRE HARNESS COMBINATION STRUCTURE

CROSS REFERENCE TO RELATED APPLICATION

This application is a continuation of PCT application No. PCT/JP2013/073439, which was filed on Aug. 30, 2013 based on Japanese Patent Application (No. 2012-192780) filed on Sep. 3, 2012, the contents of which are incorporated herein by reference. Also, all the references cited herein are incorporated as a whole.

BACKGROUND

1. Technical Field

The present invention relates to a combination structure for combining wire harnesses.

2. Background Art

For example, a battery and an inverter unit in a hybrid car or an electric car are electrically connected to each other through a high voltage (that is, for high voltage use) wire harness. The wire harness is long and arranged to pass through a vehicle underfloor.

Since the wire harness is long as described above, it is preferable that the wire harnesses can be transported in a compact state to a vehicle assembling site after being manufactured. In other words, it is preferable that the wire harnesses can be transported as many as possible in a small space.

The wire harnesses disclosed in the following JP-A-2010-47031 are rounded after being manufactured so that the wire harnesses can be transported while being accommodated in reusable shipping cartons. Accordingly, the transportation state is compact.

SUMMARY

The wire harnesses disclosed in JP-A-2010-47031 are transported in the state in which only one wire harness is accommodated in one reusable shipping carton. It is for the following reasons. That is, when a plurality of wire harnesses accommodated in one reusable shipping carton are transported, adjacent ones of the wire harnesses may move relatively to each other, for example, due to vibration etc. In this case, there is a possibility that the wire harnesses may be entangled with each other. In addition, when many adjacent wire harnesses are put on top of one another, there is a possibility that, for example, the wire harnesses may collapse.

The present inventor believes that further more wire harnesses can be transported if the inventor can provide a structure which can restrict relative movement of wire harnesses adjacent to each other to thereby prevent the wire harnesses from being entangled with each other and which can prevent the wire harnesses from collapsing even when lots of the wire harnesses are put on top of one another.

The present invention has been accomplished in consideration of the aforementioned circumstances. An object of the invention is to provide a wire harness combination structure which can restrict relative movement of adjacent wire harnesses to thereby prevent the wire harnesses from being entangled with each other and which can prevent the wire harnesses from collapsing even when lots of the wire harnesses are put on top of one another.

Solution to Problem

In order to solve the aforementioned problem, a wire harness combination structure according to the invention is characterized in the following paragraphs (1) to (6).

(1) The wire harness combination structure, including wire harnesses; wherein:
each of the wire harnesses includes at least one conductive path, an exterior member which covers an outer circumference of the conductive path, a base portion which is retrofitted to the exterior member or which is formed as one part of the exterior member integrally with the exterior member, and a combination structure portion which is integrally formed with the base portion;
the combination structure portion has a combining engagement portion and a combined engagement portion; and
the combining engagement portion of the combination structure portion in one of the wire harnesses is detachably engaged with the combined engagement portion of the combination structure portion in the other wire harness, or the combined engagement portion of the combination structure portion in one of the wire harnesses is detachably engaged with the combining engagement portion of the combination structure portion in the other wire harness, so that the wire harnesses can be combined with each other.

(2) The wire harness combination structure according to the aforementioned paragraph (1), wherein:
each of the wire harnesses has a plurality of the combination structure portions; and
the wire harnesses are engaged with one another through the combination structure portions so that the wire harnesses can be combined with one another to be entirely put on top of one another in predetermined intervals.

(3) The wire harness combination structure according to the aforementioned paragraph (1) or (2), wherein:
the exterior member includes a bendable tube portion which has flexibility and a non-bendable tube portion which has lower flexibility than the bendable tube portion.

(4) The wire harness combination structure according to the aforementioned paragraph (3), wherein:
each of the wire harnesses further includes a self-combination structure portion;
the self-combination structure portion has a self-combining engagement portion and a self-combined engagement portion; and
the self-combining engagement portion and the self-combined engagement portion are engaged with each other detachably in a state that an intermediate portion of the wire harness is bent to fold at the bendable tube portion, so that opposed parts of the wire harness itself can be detachably engaged with each other.

(5) The wire harness combination structure according to any one of the aforementioned paragraphs (1) to (4), wherein:
the base portion is a clamp or a protector retrofitted to a predetermined position of the external exterior; and
the clamp or the protector has a fixation portion and the combination structure portion, the fixation portion being provided for fixation to a fixation subject.

(6) The wire harness combination structure according to any one of the aforementioned paragraphs (1) to (5), wherein:
each of the wire harnesses has a long portion to be arranged in a vehicle underfloor.

According the wire harness combination structure in the aforementioned paragraph (1), the combination structure portions are provided in the exterior members in the wire harnesses so that the wire harnesses adjacent to each other can be combined with each other through the combination structure portions. Therefore, due to the combination, it is possible to restrict relative movement of the adjacent wire harnesses to thereby prevent the wire harnesses from being entangled with each other. In addition, when the combination structure portions are engaged with each other, the adjacent wire harnesses can be supported by each other in the engagement portions. Therefore, the wire harnesses can be prevented from collapsing even when lots of the wire harnesses are put on top of one another.

According the wire harness combination structure in the aforementioned paragraph (2), when the wire harnesses are combined in a state that the wire harnesses adjacent to each other are entirely put on top of each other in a predetermined interval by use of the plurality of the combination structure portions, the wire harnesses can be prevented from being entangled with each other and prevented from collapsing more effectively.

According the wire harness combination structure in the aforementioned paragraph (3), the exterior members have the bendable tube portions. Accordingly, the wire harnesses can be bent in desired positions. In addition, due to the rigidity in the non-bendable tube portions of the exterior members, the wire harnesses laid horizontally or vertically can be packed in an effective packing mode during transportation.

According the wire harness combination structure in the aforementioned paragraph (4), the opposed parts of each of the wire harnesses itself are engaged with each other in the state in which an intermediate portion of the wire harness is bent to fold. Thus, the wire harnesses can be placed in a compact state. In addition, according the wire harness combination structure in the aforementioned paragraph (4), the self-combination structure portion having the self-combining engagement portion and the self-combined engagement portion is further provided. Accordingly, the opposed parts of the wire harness which is bent can be engaged with each other detachably by use of such a self-combination structure portion. Accordingly, it is possible to obtain an effect that the compact state can be maintained or an effect that entanglement can be prevented more effectively.

According the wire harness combination structure in the aforementioned paragraph (5), the function of the clamp or the protector as a retrofit component can be enhanced.

According the wire harness combination structure in the aforementioned paragraph (6), it is possible to prevent the wire harnesses from being entangled with one another and prevent the wire harnesses from collapsing, for example, during transportation of the wire harnesses which are long and each of which will be arranged in a vehicle underfloor.

BRIEF DESCRIPTION OF THE DRAWINGS

FIG. 1A is a plan view of a combined wire harness which has been in a combined state, and FIG. 1B is a front view thereof.

DETAILED DESCRIPTION OF THE EXEMPLARY EMBODIMENTS

In undermentioned embodiments, in order to combine adjacent wire harnesses with each other, combining engagement portions of combination structure portions in one of the wire harnesses and combined engagement portions of combination structure portions in the other wire harness are detachably engaged with each other respectively, or combined engagement portions of combination structure portions in one of the wire harnesses and combining engagement portions of combination structure portions in the other wire harness are detachably engaged with each other respectively. The combination structure portions are retrofitted to each other in respective places of exterior members constituting the wire harnesses. Alternatively, the combination structure portions are integrally formed as one parts of the exterior members in respective places.

Embodiment 1

Figure 2:
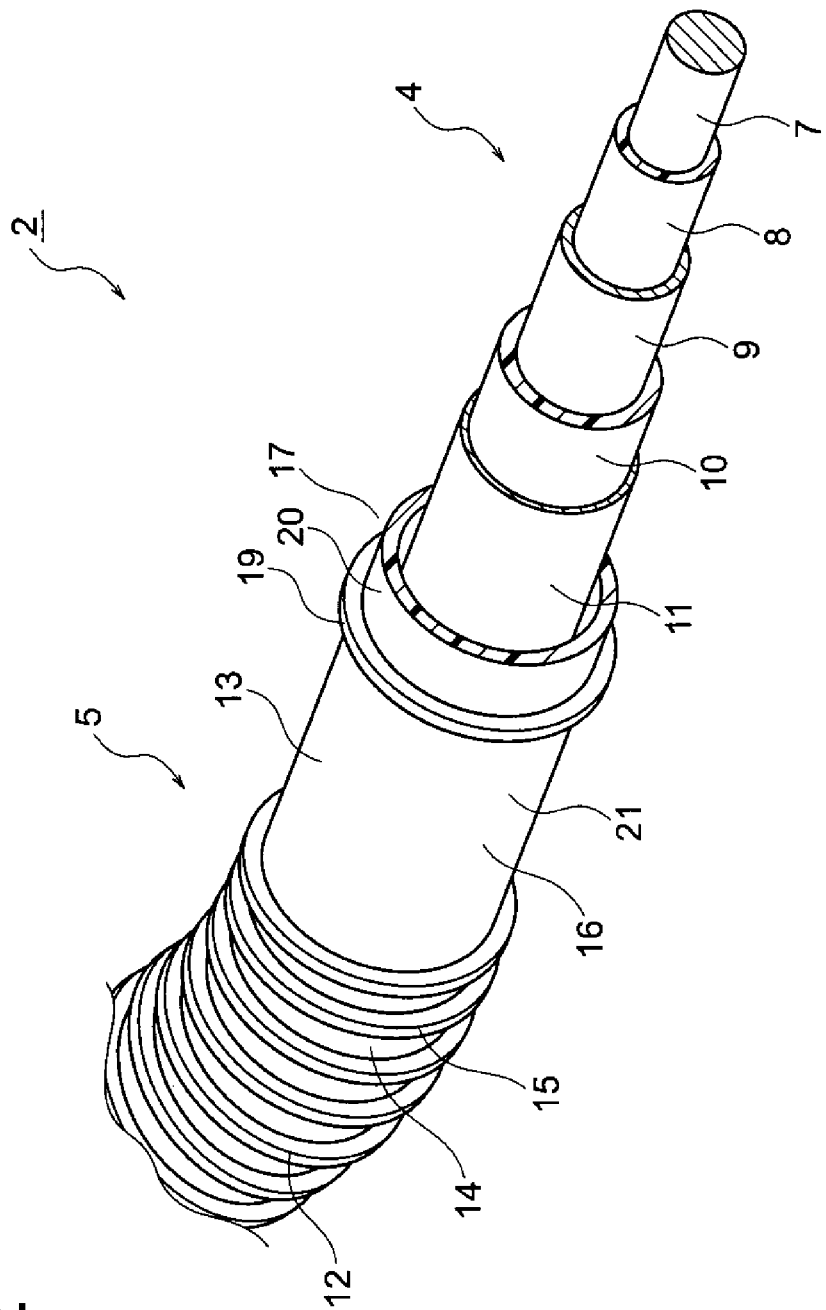
FIG. 2 is a view of the configuration of a high voltage coaxial composite conductive path.
Figure 3:
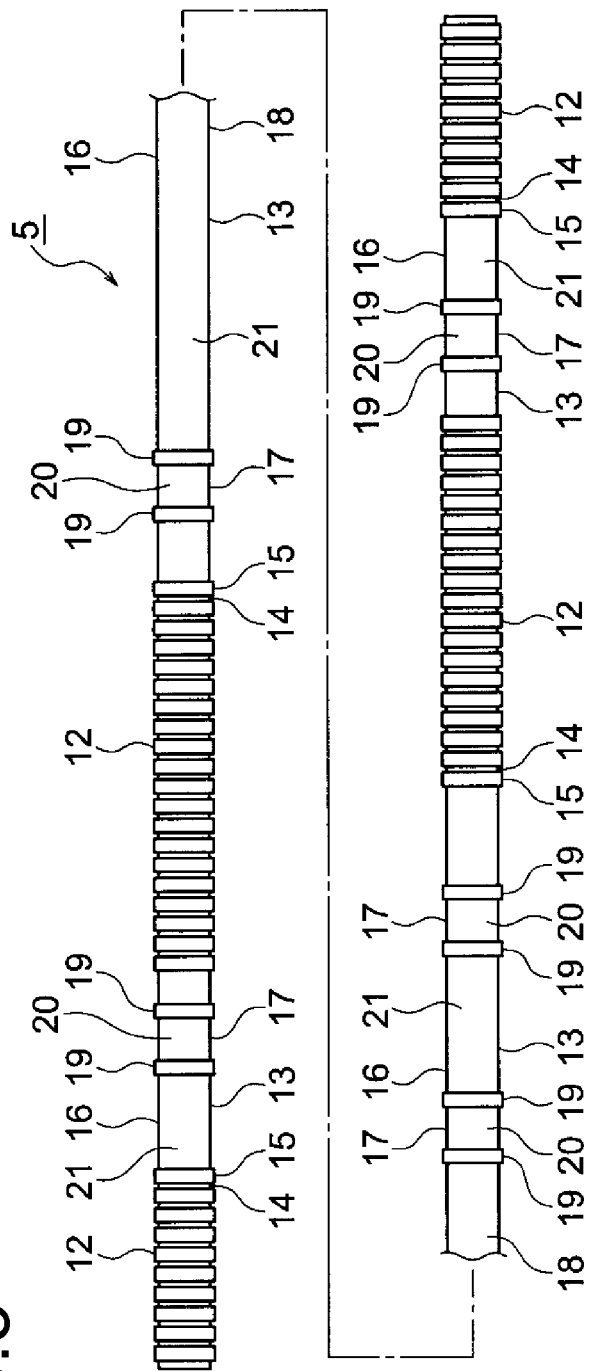
FIG. 3 is a view of the configuration of an exterior member.
Figure 4:
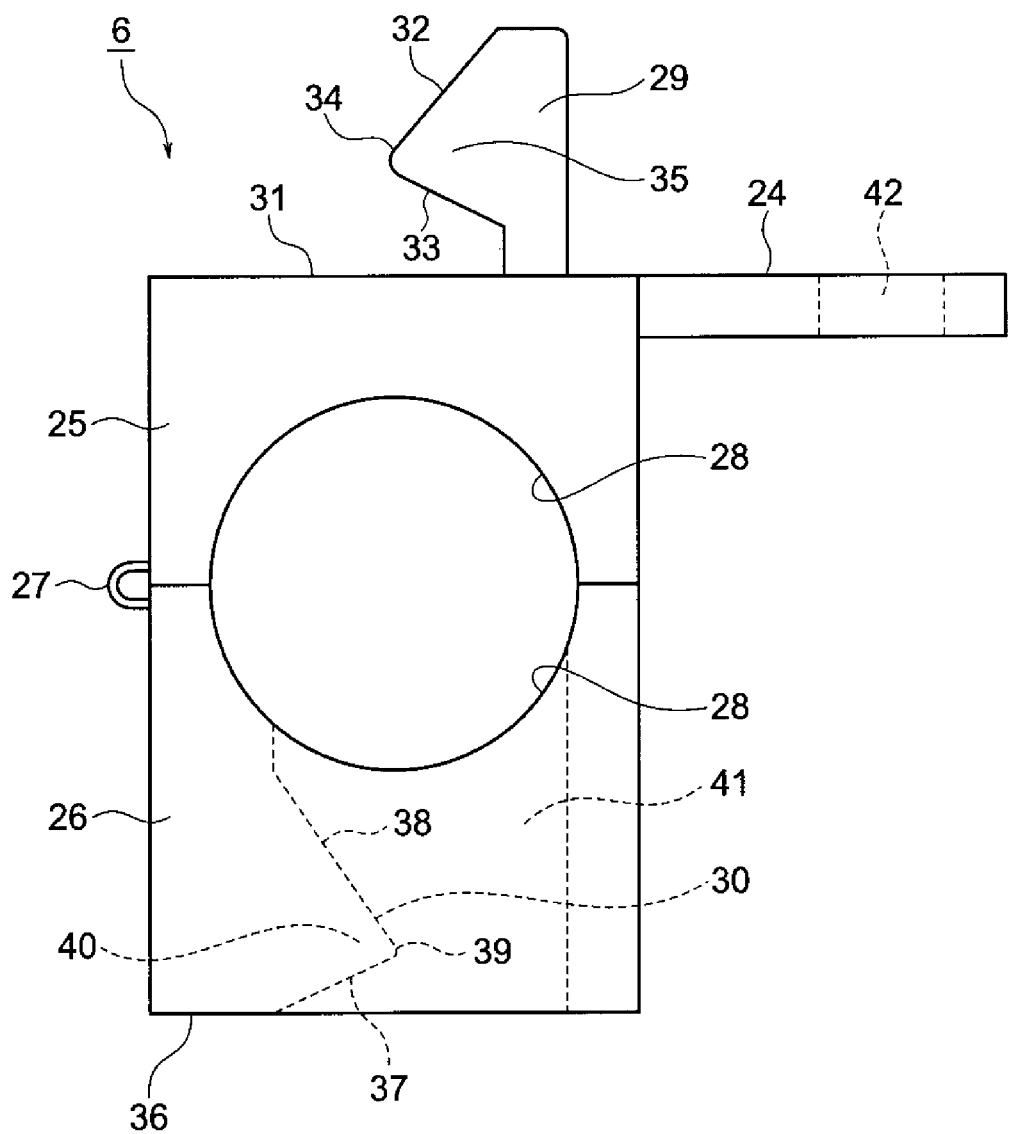
FIG. 4 is a view of the configuration of a clamp.
Figure 5:
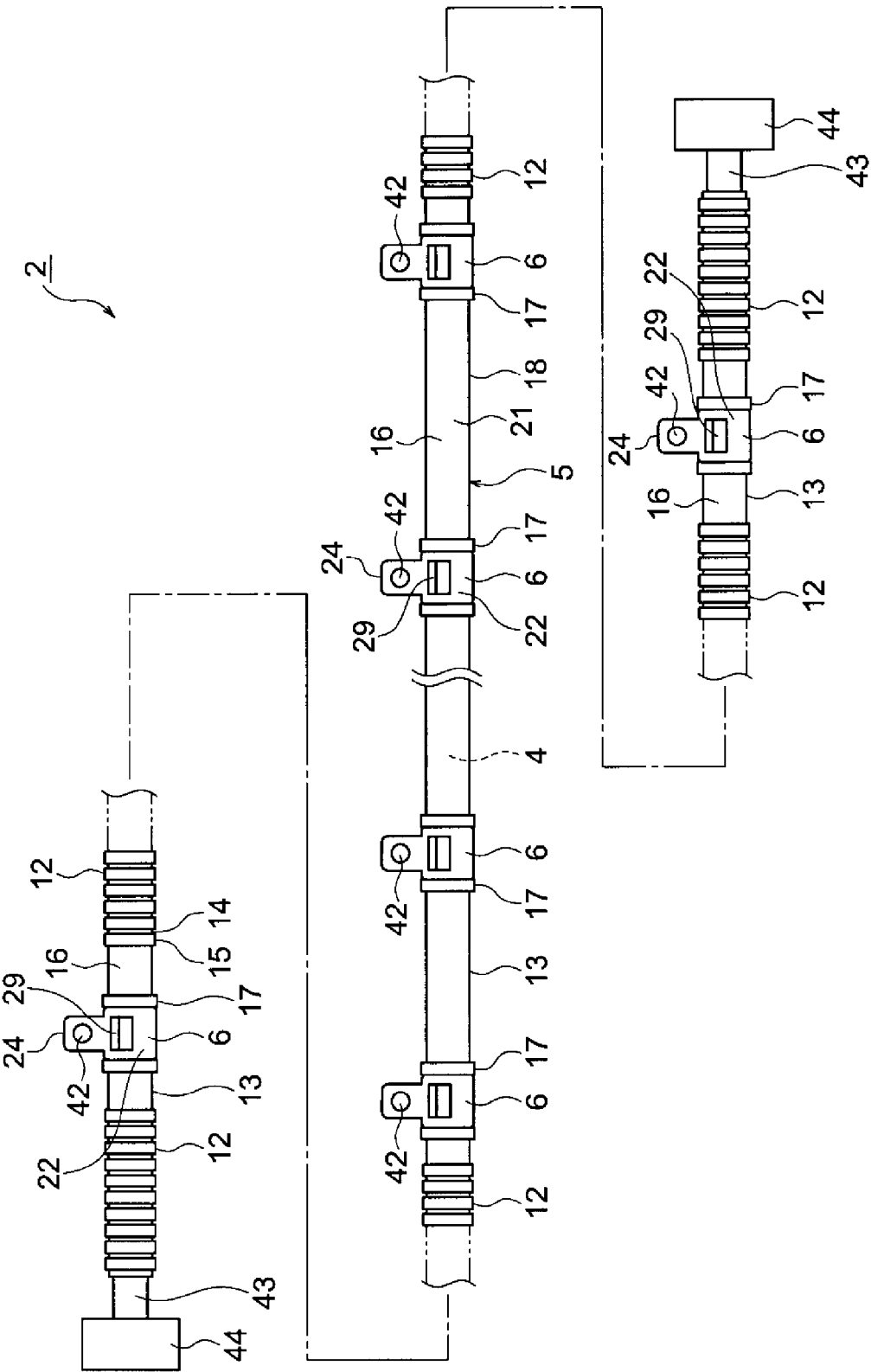
FIG. 5 is a view for explaining manufacturing of a wire harness.
Figure 6:
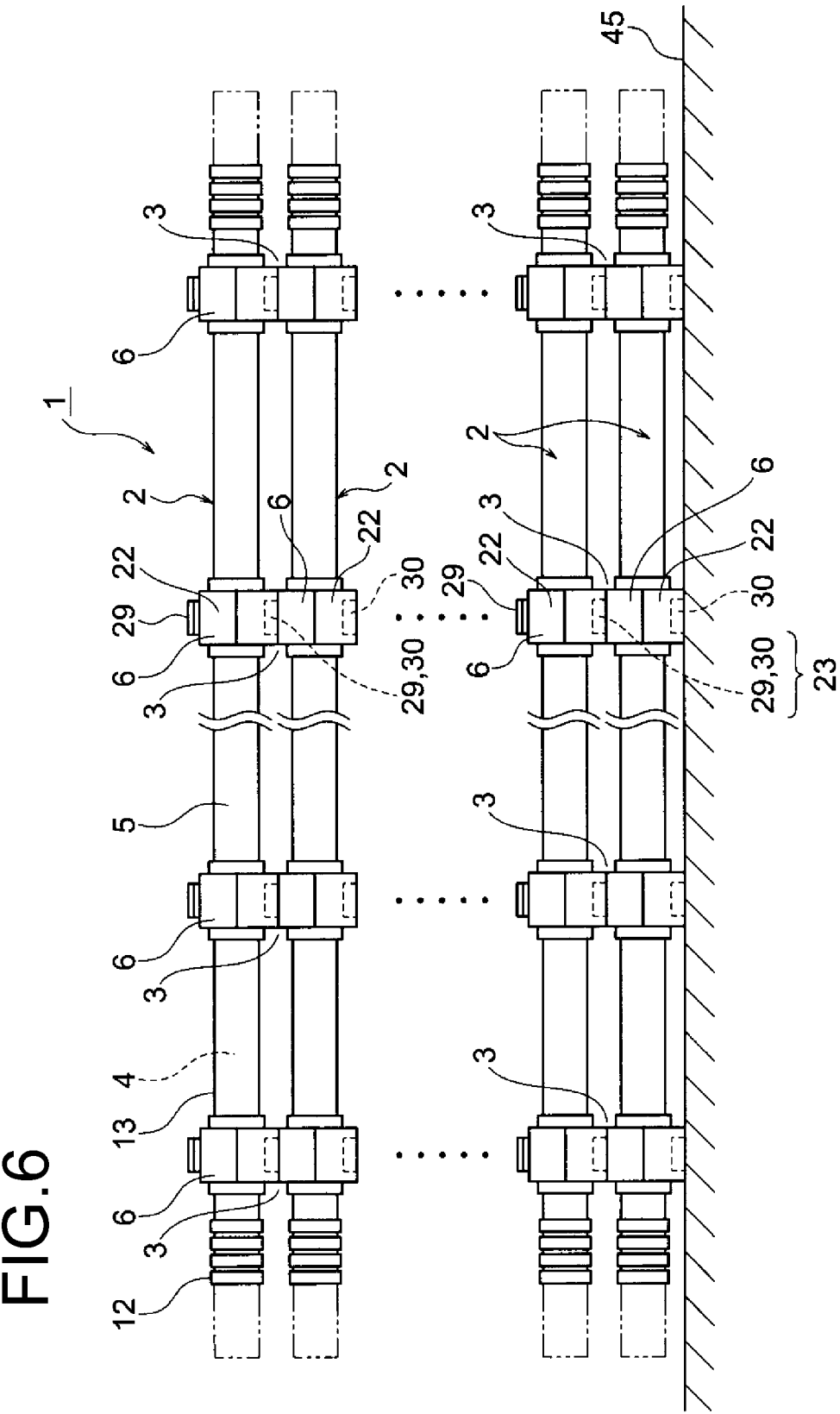
FIG. 6 is a front view of a state in which the combined wire harness is laid horizontally and packed.
Figure 7:
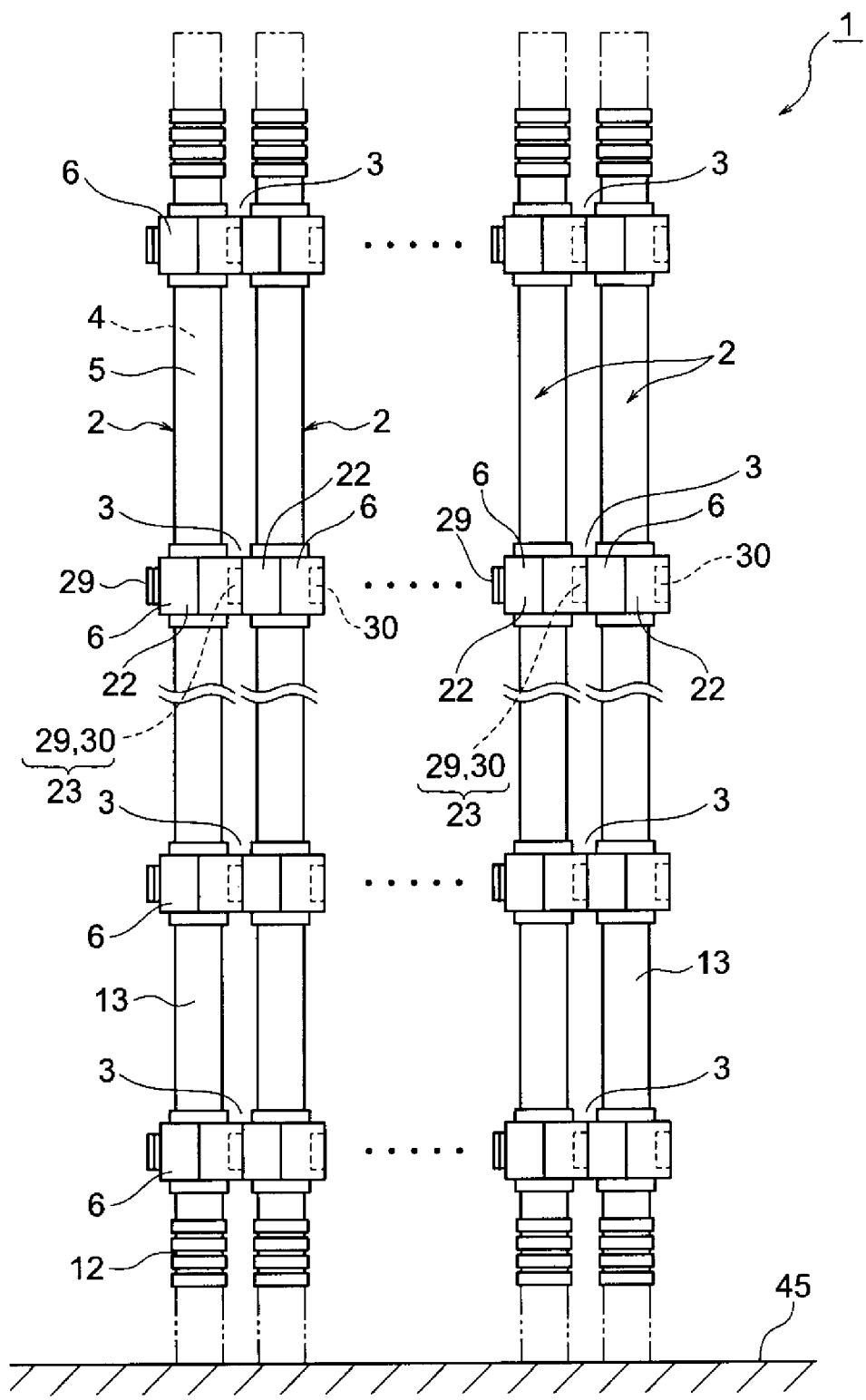
FIG. 7 is a front view of a state in which the combined wire harness is laid vertically and packed.
Figure 8:
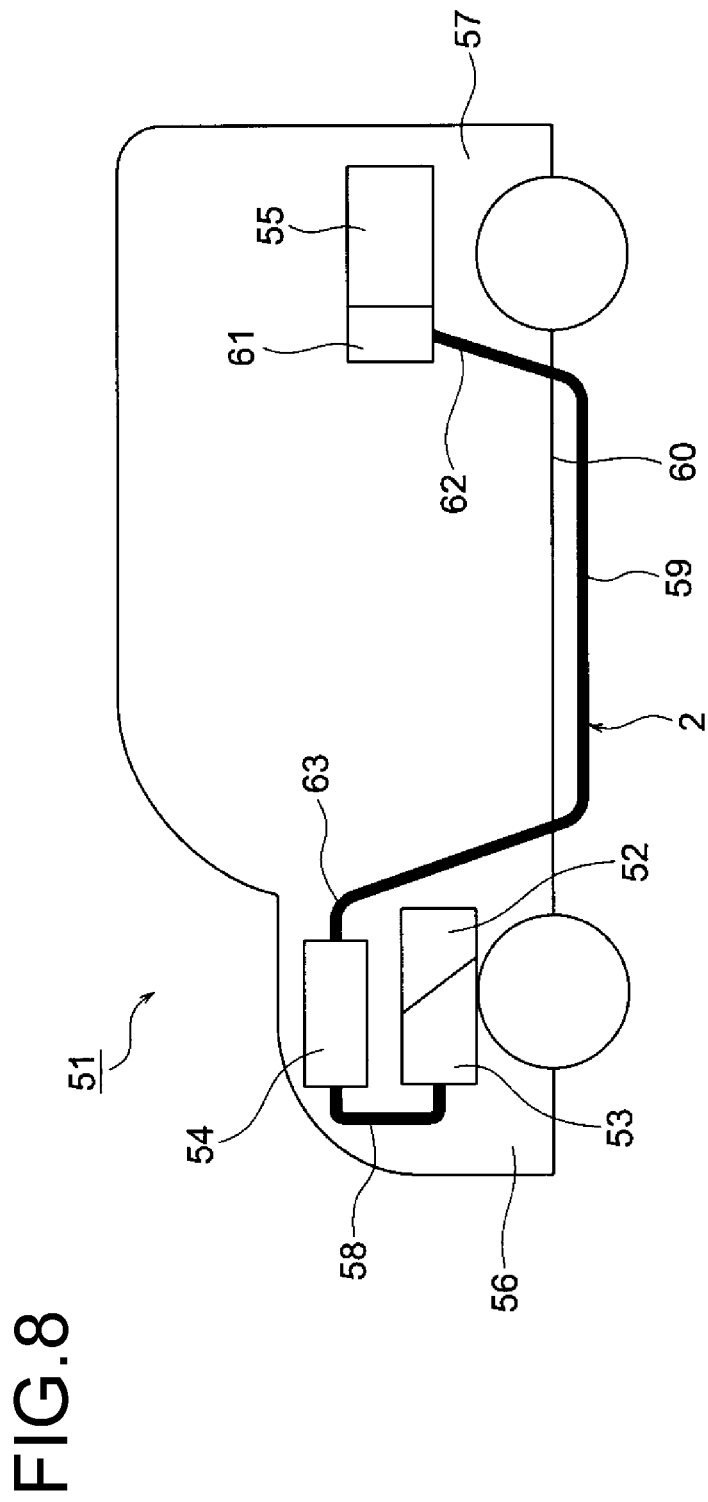
FIG. 8 is a schematic view of a vehicle in which a wire harness has been arranged.

A wire harness combination structure according to Embodiment 1 will be described below with reference to FIG. 1A to FIG. 8. FIG. 1A is a plan view of a combined wire harness which has been in a combined state and FIG. 1B is a front view thereof. In addition, FIG. 2 is a view of the configuration of a high voltage coaxial composite conductive path. FIG. 3 is a view of the configuration of an exterior member. FIG. 4 is a view of the configuration of a clamp. FIG. 5 is a view for manufacturing a wire harness. FIG. 6 is a front view of a state in which the combined wire harness is laid horizontally and packed. FIG. 7 is a front view of a state in which the combined wire harness is laid vertically and packed. FIG. 8 is a schematic view of a vehicle in which a wire harness has been arranged.

In the following description, any specific shape, material, numerical number, direction, etc. are simply exemplified for making it easy to understand the invention but may be changed suitably in accordance with use, purpose, specification, etc.

In FIG. 1A and FIG. 1B, the reference numeral 1 designates a combined wire harness. This combined wire harness 1 can be obtained by combining a plurality of long wire harnesses 2 with one another (the reference numeral 3 designates a combination portion). The combined wire harness 1 has a configuration and structure which takes into consideration a transportation form to a vehicle assembling site after the wire harnesses 2 are manufactured.

As will be understood from the following description, the wire harness combination structure according to Embodiment 1 can restrict relative movement of adjacent wire harnesses 2 to thereby prevent the wire harnesses 2 from being entangled with each other, and can prevent the wire harnesses 2 from collapsing even when lots of the wire harnesses 2 are put on top of one another. Further, with the wire harness combination structure according to Embodiment 1, lots of the wire harnesses 2 can be transported in a compact state.

First, the configuration and structure of the wire harness 2 will be described.

In FIGS. 1A and 1B and FIG. 2, the wire harness 2 is a high voltage member for electrically connecting an undermentioned inverter unit 54 (see FIG. 8) and an undermentioned battery 55 (see FIG. 8) to each other. The wire harness 2 includes a high voltage coaxial composite conductive path 4

(that is, conductive path), an exterior member 5, and a plurality of clamps 6. The wire harness 2 having such a configuration is attached to an undermentioned vehicle underfloor 60 (see FIG. 8) etc. through the clamps 6. The wire harness 2 is arranged in a predetermined path including the vehicle underfloor 60.

In FIG. 2, the high voltage coaxial composite conductive path 4 contains both a plus circuit and a minus circuit by itself. That is, the high voltage coaxial composite conductive path 4 has circuits of two systems. Specifically, the high voltage coaxial composite conductive path 4 has a first conductive path 7 which is circular in section and which is located in the center of the high voltage coaxial composite conductive path 4. In addition, the high voltage coaxial composite conductive path 4 has a first insulator 8 which covers an outer circumference of the first conductive path 7 with a predetermined thickness, and a second conductive path 9 which is provided on an outer side of the first insulator 8. In addition, the high voltage coaxial composite conductive path 4 has a second insulator 10 which covers an outer circumference of the second conductive path 9 with a predetermined thickness, and an electromagnetic shield member 11 which is cylindrical and which is in close contact with an outer surface of the second insulator 10. Incidentally, the high voltage coaxial composite conductive path 4 may further include a sheath which covers an outer circumference of the electromagnetic shield member 11 with a predetermined thickness.

The electromagnetic shield member 11 is made of a well-known braid, metal foil, etc. Although the electromagnetic shield member 11 is arranged to be included in the configuration of the high voltage coaxial composite conductive path 4 as described above, the electromagnetic shield member 11 may be arranged as follows. That is, the electromagnetic shield member 11 may be arranged to be slightly loosely fitted to the second insulator 10. The electromagnetic shield member 11 may be formed into a cylindrical shape and then brought into close contact with the outer surface of the second insulator 10. Alternatively, a tape-like or sheet-like electromagnetic shield member may be wound on the outer surface of the second insulator 10 and in close contact therewith as the electromagnetic shield member 11.

Examples of the conductive path include a well-known high voltage electric wire including a conductor and an insulator, a shield electric wire, a cab-tire cable, etc. in addition to the high voltage coaxial composite conductive path 4. Incidentally, the number of conductive paths is not limited particularly, but may be at least one.

The high voltage coaxial composite conductive path 4 has two systems in Embodiment 1. However, the high voltage coaxial composite conductive path 4 is not limited thereto, but may have three systems . . . , or n systems. Incidentally, the high voltage coaxial composite conductive path 4 can have n systems if circuits are increased outward to keep the configuration as a single coaxial path.

In FIG. 2 and FIG. 3, the exterior member 5 is a tube for accommodating and protecting the high voltage coaxial composite conductive path 4. The exterior member 5 has bendable tube portions 12 and non-bendable tube portions 13. The exterior member 5 is molded out of a resin so that the whole of the exterior member 5 can be formed into an approximately linear shape.

Each of the bendable tube portions 12 serves as a portion which can be bent during transportation or path arrangement of the wire harness 2. The non-bendable tube portions 13 are continued to the bendable tube portions 12. Each of the non-bendable tube portions 13 is provided as a portion which cannot be bent (or which can be hardly bent). That is, the non-bendable tube portions 13 have lower flexibility than the bendable tube portions 12. The bendable tube portions 12 and the non-bendable tube portions 13 are disposed and formed so that their positions and lengths can be adapted to an attachment shape to a vehicle.

Incidentally, although there are a plurality of bendable tube portions 12 and a plurality of non-bendable tube portions 13 in Embodiment 1, the number of bendable tube portions 12 and the number of non-bendable tube portions 13 are not limited particularly. That is, one bendable tube portion 12 may be formed while two non-bendable tube portions 13 are formed continuously to the opposite sides of the bendable tube portion 12 respectively. Alternatively, one non-bendable tube portion 13 may be formed while two bendable tube portions 12 are formed continuously to the opposite sides of the non-bendable tube portion 13 respectively.

Each of the bendable tube portions 12 is formed into a bellows tube shape having concave portions 14 and convex portions 15 which both extend circumferentially and which are longitudinally continuous to one another alternately. The length of each of the bendable portions 12 is set correspondingly to the bending range. Each of the bendable tube portions 12 is formed with elasticity (or flexibility) and as a portion which can be bent. The bendable tube portion 12 is formed as a portion which is the same as a well-known corrugated tube in Embodiment 1. Incidentally, the bendable tube portion 12 is not limited to the bellows tube shape as long as it has a bendable shape.

The exterior member 5 has a shape portion the same as the corrugated tube as described above. Accordingly, the exterior member 5 can be regarded as a "corrugated tube", a "partially formed corrugated tube" etc.

The exterior member 5 is formed into a shape provided with no slit (or unslitted) in its tube axis direction. The reason why no slit is provided is to secure rigidity or strength. Another reason is to prevent intrusion of water to thereby improve waterproof performance. A further reason is to prevent the high voltage coaxial composite conductive path 4 from sticking out, for example, in a bent portion.

Each of the non-bendable tube portions 13 has a non-bendable tube portion body 16 and an attachment portion 17. The non-bendable tube portion body 16 is formed as a portion which cannot be bent during transportation or path arrangement as described above. Incidentally, the portion which cannot be bent means a portion which is not aggressively provided with flexibility. The non-bendable tube portion body 16 is formed into a straight tube shape which is circular in section. Incidentally, the sectional shape of the non-bendable tube portion body 16 is not limited to a circular shape but may be an elliptical shape, an oval shape, an approximately rectangular shape, or the like. The non-bendable tube portion 13 can be regarded also as a "straight tube portion" or a "straight portion" due to the straight tube shape of the non-bendable tube portion body 16.

The non-bendable tube portion body 16 is formed to be thin with requisite minimum strength. Incidentally, although reduction of the thickness may lower rigidity, the rigidity of the attachment portion 17 can compensate for the lowered rigidity of the non-bendable tube portion body 16 or more.

The exterior member 5 has an underfloor non-bendable tube portion 18 arranged as the non-bendable tube portion 13 in the vehicle underfloor 60 (see FIG. 8) which will be described later. Since the underfloor non-bendable tube portion 18 is arranged in the vehicle underfloor 60 (for example, arranged to extend along a lean hose), the underfloor non-bendable tube portion 18 is formed to be long. The underfloor non-bendable tube portion 18 is one type of the non-bendable tube portion 13. A plurality of attachment portions 17 are provided also in such an underfloor non-bendable tube portion 18.

The attachment portions 17 are provided as attachment portions of the clamps 6 (see FIGS. 1A and 1B and FIG. 4) integrally with the non-bendable tube portion bodies 16 (that is, integrally molded). Since the exterior member 5 is made of a resin, integration of the attachment portions 17 with the exterior member 5 is easy. Incidentally, each of the attachment portions 17 is provided in a portion where the clamp 6 needs to be attached. Accordingly, some non-bendable tube portions 13 are not provided with the attachment portions 17. The attachment portions 17 in Embodiment 1 are provided, though not limited thereto, in a plurality of places of the exterior member 5.

The attachment portion 17 includes a pair of movement restriction portions 19 and an attachment/detachment portion 20. The pair of movement restriction portions 19 are disposed in positions corresponding to opposite sides of the clamp 6. The pair of movement restriction portions 19 are formed as portions which can restrict movement of the clamp 6 in the tube axis direction. In addition, the pair of movement restriction portions 19 are also formed as portions for making it easy to recognize the attachment position of the clamp 6. Each of the pair of movement restriction portions 19 is formed into a ring-like flange shape in Embodiment 1. Specifically, the movement restriction portion 19 is formed into a shape which protrudes from an outer surface 21 of the non-bendable tube portion body 16 and which is circumferentially convex. Incidentally, the shape is simply an example.

The pair of movement restriction portions 19 are formed so that the protruding height or width of each of the movement restriction portions 19 agrees, for example, with the protruding height or width of the convex portion 15 in the bendable portion 12 in Embodiment 1. Incidentally, the shape is simply an example.

The attachment/detachment portion 20 is formed as a portion where the clamp 6 can be attached directly. The outer surface 21 present between the pair of movement restriction portions 19 corresponds to the attachment/detachment portion 20 and is formed as a curved surface. Incidentally, it is considered that a portion biting into the attachment/detachment portion 20 which is a curved surface may be provided on the side of the clamp 6 so that the clamp 6 can be surely prevented from rotating after the clamp 6 is attached. In addition, although there is no particular illustration, it is also effective to provide a rotation stopping structure.

Incidentally, although the aforementioned exterior member 5 is made of a resin, it is not limited thereto but may be made of metal.

In FIG. 4, the clamp 6 is a retrofit component which is retrofitted to the exterior member 5 (see FIGS. 1A and 1B and FIG. 3). The clamp 6 has a base portion 22 which is formed in accordance with the external shape of the non-bendable tube portion 13 (that is, the external shape of the attachment/detachment portion 20), a combination structure portion 23 which is integrated with the base portion 22, and a fixation portion 24 which is continued to the base portion 22.

The base portion 22 has half-divided tube attachment portions 25 and 26, and a hinge 27 which connects the tube attachment portions 25 and 26 to each other. Not-shown fitting portions which can bring the tube attachment portions 25 and 26 into a fitting state are formed in the tube attachment portions 25 and 26 respectively. In addition, an attachment face 28 attached to the attachment/detachment portion 20 (see FIG. 3) is formed in each of the tube attachment portions 25 and 26. The attachment face 28 is formed into a circular shape in accordance with the external shape of the non-bendable tube portion 13.

The combination structure portion 23 is a portion for combining adjacent wire harnesses 2 with each other (see FIGS. 1A and 1B). Due to the combination structure portion 23, the function of the clamp 6 can be enhanced. To describe more in detail, the combination structure portion 23 has a combining engagement portion 29 which is integrally formed with the tube attachment portion 25 and a combined engagement portion 30 which is integrally formed with the tube attachment portion 26. Due to such a configuration, the clamp 6 (combination structure portion 23) has a function capable of combining the adjacent wire harnesses 2 with each other. The function cannot be provided by any well-known clamp.

The combining engagement portion 29 is formed to protrude from a base portion upper surface 31. The combining engagement portion 29 is formed into a shape which can be engaged with the combination structure portion 23 of an adjacent wire harness 2 detachably. The combining engagement portion 29 in Embodiment 1 is formed into a protrusive shape so that the engagement state can be released when an external force is applied to the combining engagement portion 29 in a predetermined direction. Incidentally, the shape is simply an example. An engaging portion 35 which has slopes 32 and 33 and a top portion 34 is formed in the combining engagement portion 29.

Incidentally, it is preferable that the slope 33 is a surface (right downward inclined surface, for example, as shown in FIG. 4) inclined, for example, with respect to the base portion upper surface 31. This is to make it possible to easily release the engagement state with the combined engagement portion 30 when the external force is applied in the predetermined direction.

The combined engagement portion 30 is a portion which is formed by recessing a base portion lower surface 36. The combined engagement portion 30 is engaged detachably with the combination structure portion 23 of an adjacent wire harness 2. The combined engagement portion 30 in Embodiment 1 is formed in accordance with the shape of the combining engagement portion 29. An engaged portion 40 which has slopes 37 and 38 and a top portion 39 is formed in the combined engagement portion 30. In addition, an engaging portion receiving space 41 is formed inside the combined engagement portion 30.

Incidentally, each of the combination structure portions 23 is not limited to the aforementioned shape as long as the adjacent wire harnesses 2 can be combined with each other by use of the combination structure portions 23. Another example will be described in Embodiment 2 (see FIG. 9).

The fixation portion 24 is formed into a cantilever shape. A bolt insertion hole 42 is formed to penetrate the fixation portion 24 in a predetermined position. The wire harness 2 (see FIG. 1A and FIG. 1B) is attached and fixed to a fixation subject such as the vehicle underfloor 60 (see FIG. 8) through not-shown bolts inserted through the bolt insertion holes 42.

Examples of other retrofit components than the clamp 6 include a clip, a grommet, a protector, etc. Incidentally, it is also effective to add the combination structure portion 23 to any of these examples.

It is also effective to add the combination structure portion 23 to the exterior member 5 so that the combination structure portion 23 can be integrated therewith.

Next, the manufacturing, the packing state and the transportation state of the wire harness 2 will be described in turn based on the aforementioned configuration and structure.

In FIG. 5, the wire harness 2 is manufactured in such a manner that the high voltage coaxial composite conductive path 4 is inserted into the exterior member 5 which is entirely molded into an approximately linear shape, and shield connectors 44 are then provided respectively in opposite terminals 43 of the high voltage coaxial composite conductive path 4. In addition, the wire harness 2 is manufactured in such a manner that the clamps 6 are attached to a plurality of predetermined positions (that is, the attachment portions 17) of the exterior member 5 respectively.

When the wire harness 2 which has been manufactured is bent to fold in portions of predetermined bendable tube portions 12, the wire harness 2 is disposed in a state that the non-bendable tube portions 13 (that is, the non-bendable tube portions 13 and the underfloor non-bendable tube portion 18) are substantially parallel with each other (see FIG. 1). More specifically, the wire harness 2 is disposed in such a state that the non-bendable tube portions 13 other than the long underfloor non-bendable tube portion 18 extend along the long underfloor non-bendable tube portion 18 and substantially in parallel with one another. When the wire harness 2 is arranged in such a state, the whole length of the wire harness 2 can be shortened and the wire harness 2 can have a minimum width. That is, the whole of the wire harness 2 is in a compact state. When a plurality of wire harnesses 2 which are arranged in this compact state are combined so as to be entirely put on top of one another in predetermined intervals, the combined wire harness 1 shown in FIG. 6 or FIG. 7 can be produced.

FIG. 6 shows a state in which the combined wire harness 1 is laid horizontally and packed. FIG. 7 shows a state in which the combined wire harness 1 is laid vertically and packed.

In order to combine adjacent wire harnesses 2 with each other, the combining engagement portions 29 of the combination structure portions 23 in one of the wire harnesses 2 are engaged with the combined engagement portions 30 of the combination structure portions 23 in the other wire harness 2, or the combined engagement portions 30 of the combination structure portions 23 in one of the wire harnesses 2 are engaged with the combining engagement portions 29 of the combination structure portions 23 in the other wire harness 2.

Incidentally, the number of wire harnesses 2 to be combined may be set desirably. For example, the number of wire harnesses 2 may be two or four or more. The number may be set correspondingly to the reusable shipping cartons or the transportation method.

According to the combination structure according to Embodiment 1, the combination structure portions 23 of adjacent wire harnesses 2 can be engaged with each other so that the wire harnesses 2 can be combined to be entirely put on top of one another in predetermined intervals. When the combination structure portions 23 are engaged with each other, relative movement of the adjacent wire harnesses 2 can be restricted. Therefore, the adjacent wire harnesses 2 can be prevented from being entangled with each other due to movement or vibration.

When the combined wire harness 1 is laid horizontally and packed in FIG. 6, the combination structure portions 23 engaged with each other are formed into columns to support the wire harnesses 2. Accordingly, even when lots of the wire harnesses 2 are put on top of one another, the wire harnesses 2 can be prevented from collapsing. Thus, this may be regarded as one effective packing mode during transportation. Incidentally, the reference numeral 45 designates a mount surface.

In FIG. 7, the plurality of wire harnesses 2 are combined in the combined wire harness 1. Due to this state and due to rigidity, arrangement, etc. of the underfloor non-bendable tube portion 18 and the other non-bendable tube portions 13, the combined wire harness 1 can be packed in vertical placement or made to stand. Accordingly, the case of FIG. 7 may be also regarded as one effective packing mode during transportation.

As described above with reference to FIG. 1A to FIG. 7, it is possible to obtain an effect that lots of the wire harnesses 2 can be transported when the combination structure according to Embodiment 1 is used.

When the combined state of the combined wire harness 1 is released after the combined wire harness 1 is transported to a vehicle assembling site, the combined wire harness 1 turns into a plurality of wire harnesses 2. That is, each wire harness 2 is in an independent state. The independent wire harness 2 is arranged, for example, in a predetermined position of a hybrid car (which may be an electric car or a general car).

In FIG. 8, the reference numeral 51 designates a hybrid car. The hybrid car 51 is a vehicle which is driven by a mixture of two motive powers of an engine 52 and a motor unit 53. Electric power is supplied from the battery 55 (in other words, battery pack) through the inverter unit 54 to the motor unit 53. The engine 52, the motor unit 53 and the inverter unit 54 are mounted in an engine room 56 in a position near to front wheels etc. in Embodiment 1. In addition, the battery 55 is mounted in a car rear portion 57 near to rear wheels etc. Incidentally, the battery 55 may be mounted in a car cabinet located at the rear of the engine room 56.

The motor unit 53 and the inverter unit 54 are electrically connected to each other through a high voltage wire harness 58. In addition, the battery 55 and the inverter unit 54 are also electrically connected to each other through the high voltage wire harness 2. The wire harness 2 has an intermediate portion 59 arranged in the vehicle underfloor 60. In addition, the intermediate portion 59 is arranged substantially in parallel with the vehicle underfloor 60. The vehicle underfloor 60 serves as a well-known body and a so-called panel member. Through holes (not shown) are formed in predetermined positions of the vehicle underfloor 60. The wire harness 2 is inserted through the through holes 2.

The wire harness 2 and the battery 55 are electrically connected to each other through a junction block 61 provided in the battery 55. A rear end 62 of the wire harness 2 is electrically connected to the junction block 61 by a well-known method. A front end 63 side of the wire harness 2 is electrically connected to the inverter unit 54 by a well-known method. Incidentally, the wire harness 2 is electrically connected through the shield connectors 44 (see FIGS. 1A and 1B and FIG. 5) in Embodiment 1.

The motor unit 53 includes a motor (not shown) and a generator (not shown). In addition, the inverter unit 54 includes an inverter (not shown) and a converter (not shown). The motor unit 53 is formed as a motor assembly including a shield casing (not shown). In addition, the inverter unit 54 is also formed as an inverter assembly including a shield casing (not shown). The battery 55 serves as an Ni-MH-based or Li-ion-based battery which is modularized. Incidentally, an electric storage device such as a capacitor may be used as the battery 55. The battery 55 is not limited particularly as long as it can be used in the hybrid car 51 or an electric car.

Embodiment 2

Figure 9:
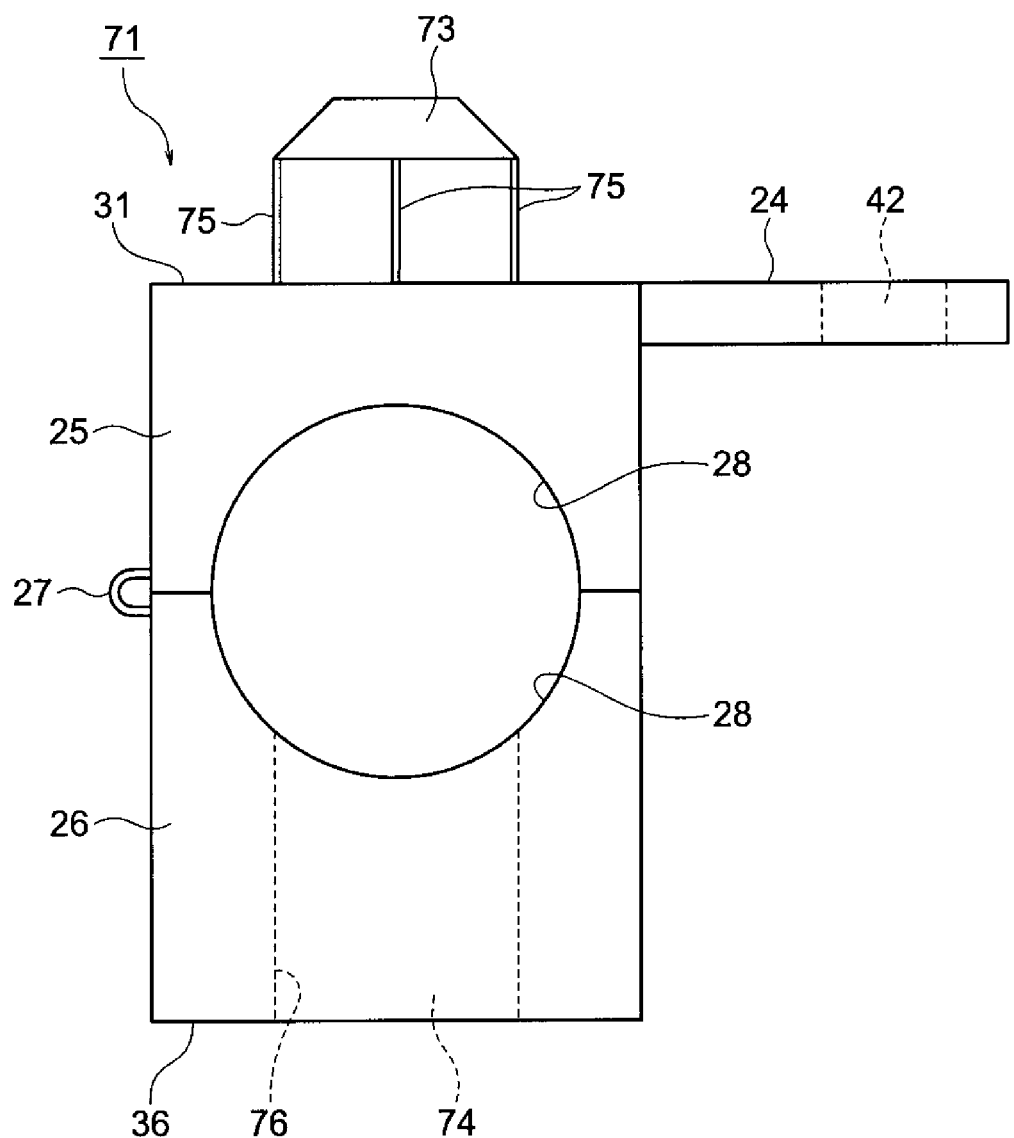
FIG. 9 is a view of the configuration of a clamp according to Embodiment 2.

A wire harness combination structure according to Embodiment 2 will be described below with reference to FIG. 9. FIG. 9 is a view of the configuration of a clamp according to Embodiment 2. Incidentally, constituent members basically the same as those in the aforementioned Embodiment 1 are referred to by the same numerals respectively and correspondingly and detailed description thereof will be omitted.

In FIG. 9, a clamp 71 is a retrofit component which is retrofitted to the exterior member 5 (see FIGS. 1A and 1B and FIG. 3). The clamp 71 has a base portion 22 which is formed in accordance with the external shape of the non-bendable tube portion 13 (that is, the external shape of the attachment/detachment portion 20), a combination structure portion which is integrated with the base portion 22, and a fixation portion 24 which is continued to the base portion 22.

The combination structure portion is a portion for combining adjacent wire harnesses 2 (see FIG. 1) with each other. Due to the combination structure, the function of the clamp 71 can be enhanced. To describe more in detail, the combination structure portion has a combining engagement portion 73 which is integrally formed with a tube attachment portion 25, and a combined engagement portion 74 which is integrally formed with a tube attachment portion 26. With such a configuration, the clamp 71 (combination structure portion) can have a function to combine the adjacent wire harnesses 2 with each other.

The combining engagement portion 73 is formed to protrude from a base portion upper surface 31. The combining engagement portion 73 is formed into a shape which can be detachably engaged with a combination structure portion of an adjacent wire harness 2. The combining engagement portion 73 in Embodiment 2 is formed into an approximately cylindrical shape so that the engagement state can be released when an external force is applied to the combining engagement portion 73 in a predetermined direction. Rib-shaped portions each with a slight height, that is, press-fitting ribs 75 are formed circumferentially in a plurality of places of the combining engagement portion 73.

The combined engagement portion 74 is a portion which is formed by recessing a base portion lower surface 36. The combined engagement portion 74 is engaged detachably with a combination structure portion of an adjacent wire harness 2. The combined engagement portion 74 in Embodiment 2 is formed in accordance with the shape of the combining engagement portion 73. The combined engagement portion 74 is formed into a hole shape which is circular in section. Incidentally, the reference numeral 76 designates a press-fitting surface formed to have a diameter into which the press-fitting ribs 75 can be squeezed.

It is a matter of course that the same effect as that in Embodiment 1 can be obtained also by use of the aforementioned clamp 71.

Incidentally, although engagement using press-fitting has been described by way of example in Embodiment 2, hooking engagement using a hook may be described as another preferable example.

Embodiment 3

Figure 10:
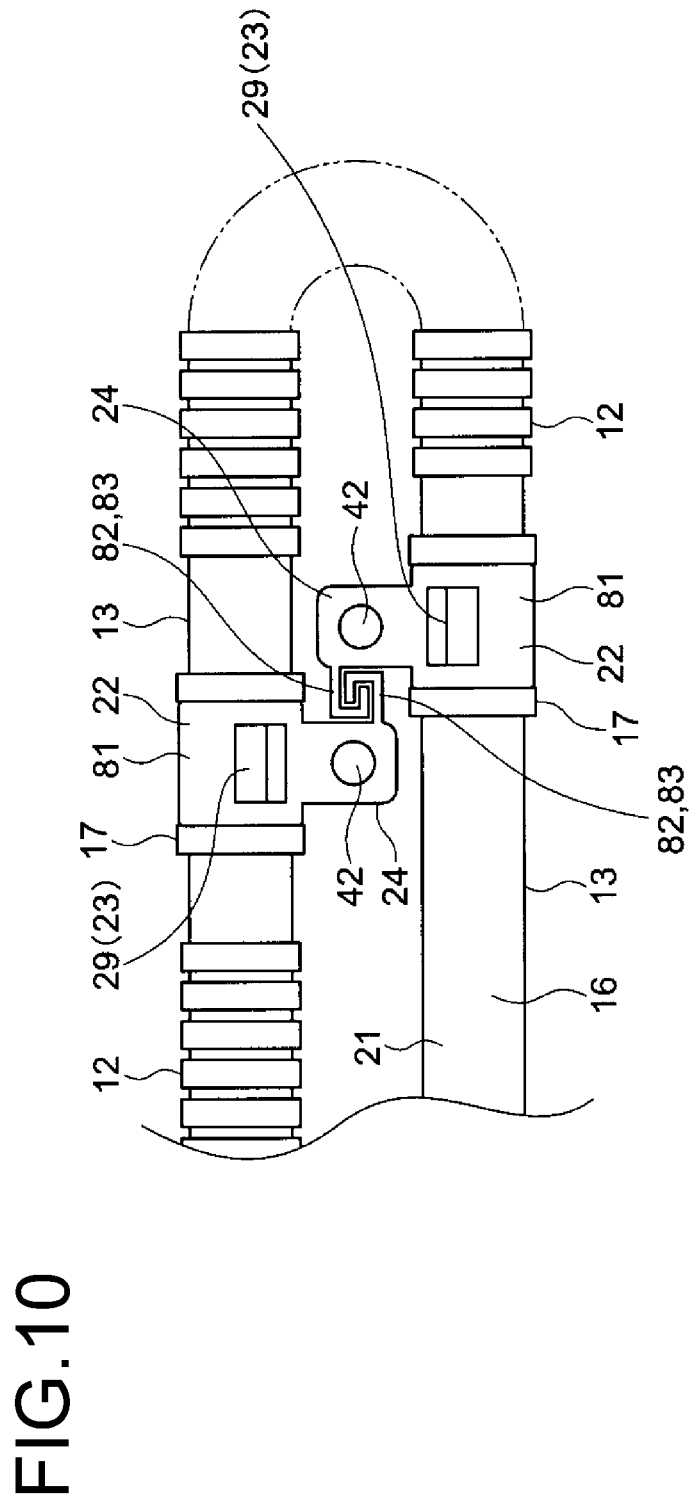
FIG. 10 is a plan view of a clamp according to Embodiment 3.

A wire harness combination structure according to Embodiment 3 will be described below with reference to FIG. 10. FIG. 10 is a plan view of a clamp according to Embodiment 3. Incidentally, constituent members basically the same as those in the aforementioned Embodiment 1 are referred to by the same numerals respectively and correspondingly and detailed description thereof will be omitted.

In FIG. 10, a clamp 81 is a retrofit component which is retrofitted to the exterior member 5 (see FIGS. 1A and 1B and FIG. 3). The clamp 81 has a base portion 22 which is formed in accordance with the external shape of the non-bendable tube portion 13 (that is, the external shape of the attachment/detachment portion 20), a combination structure portion 23 which is integrated with the base portion 22, a fixation portion 24 which is continued to the base portion 22, and a self-combination structure portion (second combination structure portion) 82 which is integrated with the fixation portion 24.

The self-combination structure portion 82 is configured to have a self-combining engagement portion (second combining engagement portion) and a self-combined engagement portion (second combined engagement portion) by use of which an intermediate portion of the wire harness 2 can be bent to fold and opposed parts of the wire harness 2 bent thus can be detachably engaged with each other. Incidentally, although not limited particularly, each of the self-combining engagement portion and the self-combined engagement portion in Embodiment 2 also serves as an engagement portion 83 which is formed into an approximate J-shape. The engagement portion 83 is integrally formed with a side portion of the fixation portion 24.

For example, the self-combining engagement portion and the self-combined engagement portion may use an insertion and press-fitting type structure, like the combining engagement portion 73 and the combined engagement portion 74 in Embodiment 2 (see FIG. 9).

In the aforementioned configuration and structure, the self-combination structure portions 82 having the engagement portions 83 (that is, the self-combining engagement portion and the self-combined engagement portion) are further included in Embodiment 3. Therefore, by use of such self-combination structure portions 82, it is possible to obtain an effect that the opposed parts of the wire harness 2 which is bent can be engaged with each other. Accordingly, it is possible to obtain an effect that a compact state in which an intermediate portion of the wire harness 2 is folded can be maintained and an effect that entanglement can be prevented more effectively.

Embodiment 4

Figure 11:
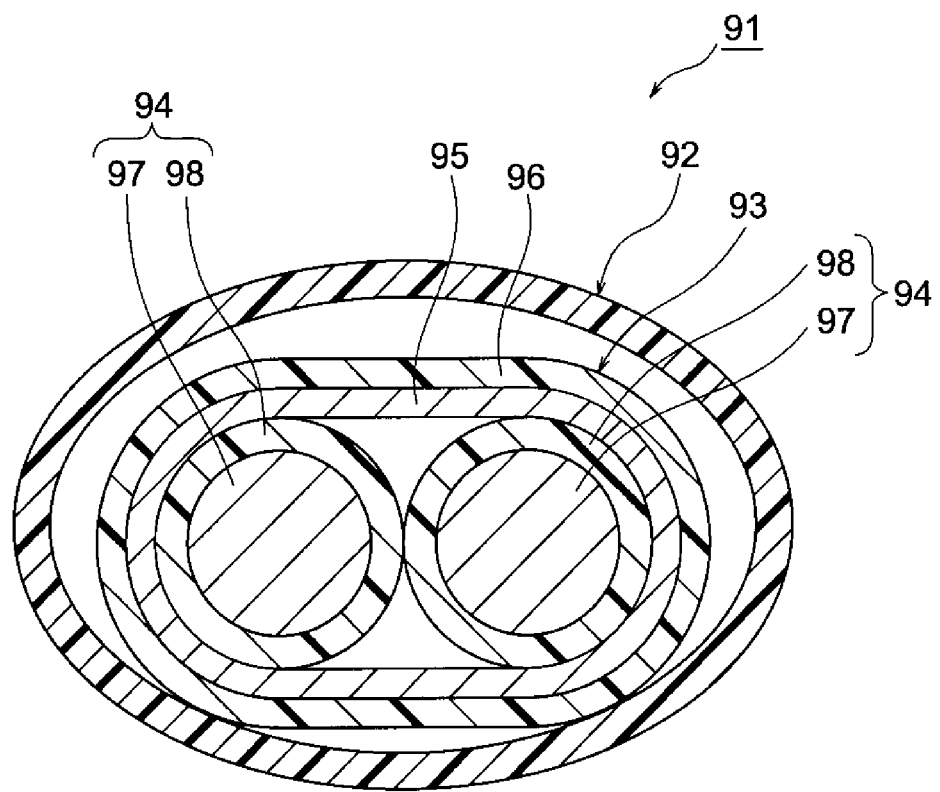
FIG. 11 is a sectional view of a wire harness according to Embodiment 4.

A wire harness combination structure according to Embodiment 4 will be described below with reference to FIG. 11. FIG. 11 is a sectional view of a wire harness according to Embodiment 4.

In FIG. 11, a wire harness 91 includes an exterior member 92 which has an elliptical shape in section, a high voltage conductive path 93 (that is, conductive path) which is covered with the exterior member 92 to be protected thereby, and a plurality of clamps (for example, clamps 6 in Embodiment 1 etc.). Incidentally, the exterior member 92 in Embodiment 4 is different only in sectional shape from that in Embodiment 1 (that is, the sectional shape is formed in accordance with the high voltage conductive path 93). Accordingly, detailed description of the exterior member 92 will be omitted herein.

The high voltage conductive path 93 includes two high voltage circuits 94, an electromagnetic shield member 95 which covers the two high voltage circuits 94, and a sheath 96 which is provided on an outer side of the electromagnetic shield member 95.

Here, each of the high voltage circuits 94 is a well-known high voltage electric wire. The high voltage circuit 94 has a conductor 97, and an insulator 98 which covers the conductor 97. The high voltage circuit 94 is formed to have a length required for making electric connection.

The conductor 97 is made of copper, a copper alloy, aluminum or an aluminum alloy. The conductor 97 may have a conductor structure which consists of twisted strands or a rod-like conductor structure which is rectangular or circular in section (for example, a conductor structure which serves as a rectangular single core or a circular single core. In this case, the electric wire itself also has a rod shape). The insulator 98 made of an insulating resin material is formed on an outer surface of the aforementioned conductor 97 by extrusion molding.

Incidentally, the configuration of a well-known high voltage electric wire is, though not limited thereto, used as the high voltage circuit 94 in Embodiment 4. That is, a high voltage circuit in which an insulator is provided in a well-known bus bar, or the like, may be used.

The electromagnetic shield member 95 is an electromagnetic shield member (that is, an anti-electromagnetic wave shield member) which covers the two high voltage circuits 94 collectively. A well-known braid which consists of a large number of wires braided into a cylindrical shape is used as the electromagnetic shield member 95. The electromagnetic shield member 95 is formed to have a length substantially the same as the whole length of the two high voltage circuits 94. An end portion of the electromagnetic shield member 95 is electrically connected to a shield casing etc. of the inverter unit 54 (see FIG. 8) through a not-shown connection portion.

For example, metal foil having conductivity or a member including the metal foil may be used as the electromagnetic shield member 95, as long as it can take a measure against the electromagnetic wave.

The sheath 96 formed by extrusion molding out of an insulating resin material into a predetermined thickness on an outer side of the electromagnetic shield member 95. The sheath 96 is disposed in a position corresponding to an outermost layer of the high voltage conductive path 93. The sheath 96 is subjected to terminal processing in manufacturing of the wire harness 91 so that the electromagnetic shield member 95 can be exposed with a predetermined length.

A plurality of the aforementioned wire harnesses 91 may be used and combined in the same manner as in Embodiment 1.

In addition, it is a matter of course that the invention can be changed variously and carried out without changing the spirit and scope of the invention.

A wire harness combination structure according to an embodiment will be summarized as follows.

(1) The wire harness combination structure according to the embodiment, including wire harnesses 2 or 91; wherein: each of the wire harnesses 2 or 91 includes at least one conductive path (high voltage coaxial composite conductive path 4 or high voltage conductive path 93), an exterior member 5 or 92 which covers an outer circumference of the conductive path, a base portion 22 which is retrofitted to the exterior member 5 or 92 or which is integrally formed with the exterior member 5 or 92 as one part of the exterior member 5 or 92, and a combination structure portion 23 which is integrally formed with the base portion 22; each of the combination structure portions 23 includes a combining engagement portion 29 and a combined engagement portion 30; and the combining engagement portion 29 of the combination structure portion 23 in one of the wire harness is detachably engaged with the combined engagement portion 30 of the combination structure portion 23 in the other wire harness, or the combined engagement portion 30 of the combination structure portion 23 in one of the wire harnesses is detachably engaged with the combining engagement portion 29 of the combination structure portion 23 in the other wire harness, so that the wire harnesses are combined with each other.

(2) The wire harness combination structure according to the embodiment, wherein: each of the wire harnesses 2 or 91 has a plurality of the combination structure portions 23; and the wire harnesses 2 or 91 are engaged with one another through the plurality of the combination structure portions 23 so that the wire harnesses can be combined with one another to be entirely put on top of one another in predetermined intervals.

(3) The wire harness combination structure according to the embodiment, wherein: the exterior member 5 or 92 includes a bendable tube portion 12 which has flexibility and a non-bendable tube portion 13 which has lower flexibility than the bendable tube portion 12.

(4) The wire harness combination structure according to the embodiment, wherein: each of the wire harnesses 2 or 91 further includes a self-combination structure portion 82; the self-combination structure portion 82 has a self-combining engagement portion (83) and a self-combined engagement portion (83); and the self-combining engagement portion and the self-combined engagement portion are engaged with each other detachably in a state that an intermediate portion of the wire harness 2 or 91 is bent to fold at the bendable tube portion 12, so that opposed parts of the wire harness 2 or 91 itself can be detachably engaged with each other.

(5) The wire harness combination structure according to the embodiment, wherein: the base portion 22 is a clamp 6, 71 or 81 or a protector retrofitted to a predetermined position of the external exterior 5 or 92; and the clamp 6, 71 or 81 or the protector has a fixation portion 24 and the combination structure portion 23, the fixation portion 24 being provided for fixation to a fixation subject (vehicle underfloor 60).

(6) The wire harness combination structure according to the embodiment, wherein: each of the wire harnesses 2 or 91 has a long portion (intermediate portion 59) to be arranged in the vehicle underfloor 60.

According to the wire harness combination structure according to the invention, it is useful in the point that it is possible to provide a wire harness combination structure which can restrict relative movement of adjacent wire harnesses to thereby prevent the wire harnesses from being entangled with each other and which can prevent the wire harnesses from collapsing even when lots of the wire harnesses are put on top of one another.

What is claimed is:

1. A wire harness combination structure, comprising a plurality of wire harnesses, wherein:
   each of the wire harnesses respectively comprises:
     a conductive path,
     an exterior member covering an outer circumference of the conductive path,
     a base portion retrofitted to the exterior member or integrally formed with the exterior member as one part of the exterior member,
     a self-combination structure portion, and
     a combination structure portion integrally formed with the base portion;
   the combination structure portion comprises:
     a combining engagement portion, and
     a combined engagement portion;
   the self-combination structure portion comprises
     a self-combining engagement portion, and
     a self-combined engagement portion;
   the combining engagement portion of the combination structure portion of a first wire harness of the plurality of wire harnesses is configured to detachably engage with the combined engagement portion of the combination structure portion in a second wire harness of the plurality of wire harnesses, or the combined engagement portion of the combination structure portion of the first wire is configured to detachably engage with the combining engagement portion of the combination structure portion of the second wire harness, so that the wire harnesses are combined with each other, and the self-combining engagement portion and the self-combined engagement portion are configured to detachably engage with each other in a state that the first wire harness of the plurality of wire harnesses is bent so that opposed portions of the first wire harness can be detachably engaged with each other.

2. The wire harness combination structure according to claim 1, wherein:
   each of the plurality of wire harnesses comprises a plurality of the combination structure portions; and
   the plurality of wire harnesses are configured to be engaged with one another through the combination structure portions so that the plurality of wire harnesses are combined with one another to be entirely put on top of one another in predetermined intervals.

3. The wire harness combination structure according to claim 1, wherein the exterior member comprises a bendable tube portion which has flexibility and a non-bendable tube portion which has lower flexibility than the bendable tube portion.

4. The wire harness combination structure according to claim 1, wherein:
   the base portion comprises a clamp or a protector retrofitted to a predetermined position of the external exterior; and
   the clamp or the protector comprises a fixation portion and the combination structure portion, the fixation portion being provided for fixation to a fixation subject.

5. The wire harness combination structure according to claim 1, wherein each of the wire harnesses comprises a long portion to be arranged in a vehicle underfloor.

6. The wire harness combination structure according to claim 1, wherein
   the combining engagement portion comprises a protrusion protruding from the base portion,
   the combined engagement portion comprises a recess in the base portion, a shape of the recess being formed in accordance with a shape of the protrusion, and
   the combining engagement portion of the combination structure portion of the first wire harness is configured to detachably engage with the combined engagement portion of the combination structure portion of the second wire harness when inserted into the recess.

7. The wire harness combination structure according to claim 6, wherein the protrusion of the combining engagement portion is substantially cylindrical.

8. The wire harness combination structure according to claim 6 wherein the combining engagement portion further comprises a plurality of press-fitting ribs formed on an exterior surface of the protrusion.

\* \* \* \* \*